Patented June 9, 1942

2,285,413

UNITED STATES PATENT OFFICE 2,285,413

MANUFACTURE OF PYRROLIDINES

George H. Coleman, Iowa City, Iowa

No Drawing. Application August 2, 1940,
Serial No. 350,109

8 Claims. (Cl. 260—313)

This invention relates to a new method of preparing pyrrolidine and derivatives thereof. In particular, my improved process gives very high yields of pyrrolidine and derivatives thereof. These compounds may be represented by the general formula:

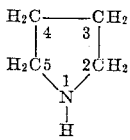

wherein additional substituents such as hydrocarbon radicals may be substituted on one or more of the carbon atoms in the pyrrolidine ring, especially in the "2" position.

It has been proposed heretofore to prepare pyrrolidine by ring closure by heating 4-chloro-1-aminobutane in alkaline solution (Gabriel, Ber. 24, 3234). Also, Ladenburg (Ber. 20, 442) proposed the dry distillation of the hydrochloride of tetramethylenediamines for the preparation of pyrrolidine. The yields of pyrrolidine by these methods are very low.

I have discovered that very high yields of pyrrolidine and C-substituted derivatives thereof can be prepared by ring closure of compounds which may be represented by the following formula:

wherein R represents a blocking group such as acetyl, benzoyl and benzenesulfonyl and derivatives thereof and $R_1$ represents an alkyl group containing a chain of at least four carbon atoms having a hydrogen on the fourth carbon atom from the nitrogen, by using strong sulfuric acid having a concentration preferably within the range of 89 to 96%. Acid of a concentration ranging from 95 to 99% and from 89 to 85% may also be used but concentrations within these ranges give lower yields than acid concentrations within the preferred range. This ring closure, with scission of the acyl, aroyl or arylsulfonyl blocking groups, is carried out by heating the sulfuric solution at temperatures of 150° C. or below and preferably within the range of 70–140° C.; however, my invention is not limited to these lower temperature conditions. The time required to effect the reaction may vary from about one-half hour to ten hours.

The N-acyl, N-aroyl and N-arylsulfonyl-N-chloroalkylamines which are used for the preparation of pyrrolidine and derivatives thereof, may be prepared by methods well known in the art, such as the chlorination of N-alkylated sulfonamides and N-alkylated acid amides with chlorine or hypochlorite. I have used the following methods very successfully:

PREPARATION 1

Preparation of N-chloro-N-acetyl-n-butylamine

A weighed quantity (9.2 g.) of N-n-butylacetamide was dissolved in 100 ml. of 20% acetic acid and the resulting solution cooled in ice water. An excess of chlorine gas was then passed into the solution. During the chlorination the reaction mixture was maintained at a low temperature by immersion in ice water. The N-chloro-N-acetyl-n-butylamine separated as an oil and was extracted from the aqueous solution with carbon tetrachloride. The carbon tetrachloride solution was washed with cold dilute sodium hydroxide, water and finally dried over anhydrous sodium sulfate. The yield of N-chloro-N-acetyl-n-butylamine was about 80% of theory.

By carrying out the chlorination under several atmospheres pressure, the time required for chlorination was shortened and the average yield of N-chloro-N-acetyl-n-butylamine increased to 90%.

PREPARATION 2

Preparation of N-chloro-N-p-toluenesulfonyl-n-butylamine

Thirty-five grams (0.15 mol) of N-n-butyl-p-toluenesulfonamide was dissolved in 100 ml. of cold chloroform. The solution was cooled in an ice-salt mixture. To this was added, with stirring, a solution containing 0.17 mol of sodium hypochlorite. The mixture was stirred mechanically for thirty minutes. The aqueous layer was then separated from the chloroform solution and the process repeated with a second portion of sodium hypochlorite solution.

The mixture was again separated and the chloroform layer washed with cold dilute sodium hydroxide, water, and finally dried over anhydrous calcium chloride. During these operations the solution was cooled in an ice bath whenever possible. The yield of N-chloro-N-p-toluenesulfonamide was from 85 to 90% of theory.

PREPARATION 3

Preparation of N-chloro-N-benzenesulfonyl-n-butylamine

A suspension of 23.96 g. of N-n-butylbenzenesulfonamide in a solution of 5.0 g. of sodium hydroxide in 100 cc. of water was cooled to 0° C. and chlorine passed into the mixture until chlorination was complete. The mixture was transferred to a separatory funnel and extracted with chloroform. The chloroform solution was then washed with two 100 cc. portions of 1N sodium hydroxide. Analysis of the chloroform solution indicated the N-chloro-N-benzenesulfonyl-n-butylamine was formed in a yield of 99.3% of theory.

PREPARATION 4

*Preparation of N-chloro-N-benzenesulfonyl-n-butylamine*

The procedure of Preparation 3 was followed except that after the chlorination, the oily N-chloro-N-benzene-sulfonyl-n-butylamine was washed with water. The oily product assayed essentially 100% and was obtained in essentially theoretical yield.

Illustrative examples of the N-chloro-N-acyl-alkylamines, N-chloro-N-aroyl-alkylamines and N-chloro-N-arylsulfonyl-alkylamines which may be used to prepare pyrrolidine and derivatives thereof are: N-chloro-N-acetyl-n-butylamine, N-chloro-N-propionyl-n-butylamine, N-chloro-N-butyryl-n-butylamine, N-chloro-N-acetyl-n-amylamine, N-chloro-N-acetyl-n-hexylamine, N-chloro-N-acetyl-n-octylamine, N-chloro-N-acetyl-n-decylamine, N-chloro-N-propionyl-iso-amylamine, N-chloro-N-propionyl-iso-octylamine, N-chloro-N-benzenesulfonyl-n-butylamine, N-chloro-N-benzenesulfonyl-n-amylamine, N-chloro-N-p-toluenesulfonyl-n-butylamine, N-chloro-N-p-toluenesulfonyl-isooctylamine, N-chloro-N-benzoyl-n-butylamine and N-chloro-N-benzoyl-n-amylamine.

All of these compounds include the following chain structure:

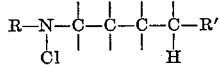

wherein R represents an acyl, aroyl or arylsulfonyl group; R' represents either hydrogen, or a hydrocarbon radical and derivatives thereof; and wherein the bonds on the carbon chain may be substituted with alkyl radicals or hydrogen.

The examples set forth hereinafter illustrate the application of my process for the preparation of pyrrolidine.

EXAMPLE I

*Ring closure of N-chloro-N-acetyl-n-butylamine*

A cold carbon tetrachloride solution containing 0.058 mols of N-chloro-N-n-butylacetamide was placed in a separatory funnel and extracted with 80 ml. of cold 95% sulfuric acid. The sulfuric acid layer was separated, placed in a flask and heated with stirring to 140° C. This heating was continued for one hour. The reaction mixture was then allowed to cool, the final cooling being carried out in an ice bath. The cool sulfuric acid solution was added slowly and with stirring to ice, the resulting solution made alkaline with caustic and the pyrrolidine steam distilled into dilute hydrochloric acid. The aqueous solution of pyrrolidine hydrochloride was evaporated to dryness on a steam bath.

The pyrrolidine was isolated and purified as p-toluenesulfonyl-pyrrolidine in the following manner: The crude pyrrolidine hydrochloride was dissolved in water and the aqueous solution treated with equivalent quantities of p-toluenesulfonyl chloride and sodium hydroxide. The resulting p-toluenesulfonyl-pyrrolidine was recrystallized from ligroin. On the basis of this derivative, the yield of pyrroliden was 50.1% of theory. The pyrrolidine may be liberated from this derivative by hydrolyzing the derivative in presence of an acid, such as sulfuric acid, neutralizing with an alkali and then distilling the pyrrolidine from the mixture.

In the foregoing example the ratio of N-chloro-N-acetyl-n-butylamine to sulfuric acid may increase several fold, for example, from 0.1 to 0.4 mols of the N-chloro-N-acetyl-n-butylamine may be used with the 80 ml. of cold 95% sulfuric acid.

EXAMPLE II

*Ring closure of N-chloro-N-p-toluenesulfonyl-n-butylamine*

A cold chloroform solution containing 44.55 g. of N-chloro-N-p-toluene-sulfonyl-n-butylamine was placed in a separatory funnel and extracted successively with 80 cc. and 40 cc. portions of cold concentrated (95.3%) sulfuric acid. The combined sulfuric acid extracts were cooled to 3° C., 15 grams of ice slowly added, and the solution rapidly heated to 90° C. This temperature was maintained for one-half hour. Hydrogen chloride was evolved after approximately 15 minutes of heating. The temperature was then increased to 100° C. over a period of 5 minutes and this new temperature was maintained for one-half hour. Additional hydrogen chloride was evolved. The contents of the flask was then cooled to 10° C. and poured over 60 grams of ice. A brown precipitate weighing 12.75 grams was recovered, which represented recovered amide. The filtrate from the above precipitate was made strongly alkaline and steam distilled into dilute hydrochloric acid. On evaporation of the distillate, 11.18 grams of crude pyrrolidine hydrochloride were obtained, representing a yield of 86.4% theory. This product gave a yield of pure pyrrolidine of at least 70%.

EXAMPLE III

*Ring closure of N-chloro-N-benzenesulfonyl-n-butylamine*

A solution of 34.88 grams of N-chloro-N-benzenesulfonyl-n-butylamine in a mixture of 220 grams of concentrated (95%) sulfuric acid and 24 grams of water at 2° C. was rapidly heated to 90° C. in 15 minutes. The temperature of the reaction mixture was then gradually raised to 130° C. during 4½ hours, and this temperature maintained for 4½ hours longer. The pyrrolidine formed was recovered by cooling the sulfuric acid solution, quenching with ice, adding sufficient sodium hydroxide to free the pyrrolidine and distilling the liberated base. The yield of pyrrolidine was 77.8% of theory.

EXAMPLE IV

*Ring closure of N-chloro-N-benzene-sulfonyl-n-butylamine*

A mixture of 220 grams of concentrated sulfuric acid and 24 grams of water was heated to 130° C. and 34.88 grams of N-chloro-N-benzenesulfonyl-n-butlyamine added in portions with constant stirring over a period of 5 hours. The reaction mixture was then worked up as in Example 7. The yield of pyrrolidine was 69% of theory.

In the foregoing examples concerning the ring closure of N-chloro-N-arylsulfonyl-alkylamines the ratio of said products to sulfuric acid may be increased several fold, for example, from 0.05 to 0.3 mols of the said products may be used with the 80 ml. of cold 95% sulfuric acid.

The following table further illustrates the type of pyrrolidines that result from the various types of N-chloroalkylamines which contain an N-blocking group:

| N-chloro-alkylamines | Product |
| --- | --- |
| N-chloro-N-acetyl-n-butylamine | Pyrrolidine. |
| N-chloro-N-propionyl-n-butylamine | Do. |
| N-chloro-N-butyryl-n-butylamine | Do. |
| N-chloro-N-benzenesulfonyl-n-butylamine | Do. |
| N-chloro-N-p-toluenesulfonyl-n-butylamine | Do. |
| N-chloro-N-benzoyl-n-butylamine | Do. |
| N-chloro-N-acetyl-n-amylamine | 2-methylpyrrolidine. |
| N-chloro-N-propionyl-isoamylamine | 3-methylpyrrolidine. |
| N-chloro-N-benzoyl-n-amylamine | 2-methylpyrrolidine. |
| N-chloro-N-acetyl-n-octylamine | 2-n-butylpyrrolidine. |
| N,chloro-N-benzenesulfonyl-n-octylamine | Do. |

The examples set forth hereinbefore illustrate the type of pyrrolidines which are formed in my process. By this process either pyrrolidine or C-substituted pyrrolidines are formed.

In addition to sulfuric acid, I may use other mineral acids such as phosphoric acid or mixtures of sulfuric and phosphoric acids. The methods employed with these acids are the same as those set forth hereinabove.

The pyrrolidines which are formed in my process may also be recovered by extraction of the liberated bases with immiscible solvents. Although I prefer to recover pyrrolidine by distillation, the extraction method is preferable with some of the substituted pyrrolidines. Examples of the solvents which may be used in the extraction step are ether, benzene, chloroform, carbon tetrachloride, petroleum ether and the like.

Inasmuch as the above specification comprises illustrative embodiments of my invention, it is to be understood that the invention is not limited thereto except by the appended claims and that changes and modifications may be made without departing substantially from the invention defined by the claims.

I claim:

1. In the method of making a pyrrolidine, the steps which comprise reacting a compound having the general formula:

wherein R represents a radical selected from the group consisting of acyl, aroyl and arylsulfonyl radicals and $R_1$ represents an aliphatic hydrocarbon radical containing at least 4 carbon atoms and having a hydrogen on the fourth carbon atom from the nitrogen atom, with sulfuric acid, neutralizing the reaction mixture and separating therefrom the thus formed pyrrolidine.

2. In the method of making a pyrrolidine, the steps which comprise reacting a compound having the general formula:

wherein R represents a radical selected from the group consisting of acyl, aroyl and arylsulfonyl radicals and $R_1$ represents an aliphatic hydrocarbon radical containing at least 4 carbon atoms and having a hydrogen on the fourth carbon atom from the nitrogen atom, with sulfuric acid of a concentration within the range of 85 to 99%, neutralizing the reaction mixture and separating therefrom the thus formed pyrrolidine.

3. In the method of making a pyrrolidine, the steps which comprise reacting a compound having the general formula

wherein R represents a radical selected from the group consisting of acyl, aroyl and arylsulfonyl radicals and $R_1$ represents an aliphatic hydrocarbon radical containing at least 4 carbon atoms and having a hydrogen on the fourth carbon atom from the nitrogen, with sulfuric acid, neutralizing the reaction mixture and distilling therefrom the thus formed pyrrolidine.

4. In the method of making pyrrolidine, the steps which comprise reacting a compound having the general formula

wherein R represents a radical selected from the group consisting of acyl, aroyl and arylsulfonyl radicals and $R_1$ represents a normal butyl radical, with sulfuric acid, neutralizing the reaction mixture and separating therefrom the thus formed pyrrolidine.

5. In the method of making a pyrrolidine, the steps which comprise reacting a compound having the general formula:

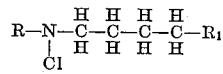

wherein R represents a radical selected from the group consisting of acyl, aroyl and arylsulfonyl radicals and $R_1$ represents a hydrocarbon radical, with sulfuric acid, neutralizing the reaction mixture and separating therefrom the thus formed pyrrolidine.

6. In the method of making a pyrrolidine, the steps which comprise reacting a compound having the general formula

wherein R represents an acetyl radical and $R_1$ represents an aliphatic hydrocarbon radical containing at least 4 carbon atoms and having a hydrogen on the fourth carbon atom from the nitrogen atom, with sulfuric acid, neutralizing the reaction mixture and separating therefrom the thus formed pyrrolidine.

7. In the method of making a pyrrolidine, the steps which comprise reacting a compound having the general formula

wherein R represents a benzoyl radical and $R_1$ represents an aliphatic hydrocarbon radical containing at least 4 carbon atoms and having a hydrogen on the fourth carbon atom from the nitrogen atom, with sulfuric acid, neutralizing the reaction mixture and separating therefrom the thus formed pyrrolidine.

8. In the method of making a pyrrolidine, the steps which comprise reacting a compound having the general formula

wherein R represents a p-toluene sulfonyl radical and $R_1$ represents an aliphatic hydrocarbon radical containing at least 4 carbon atoms and having a hydrogen on the fourth carbon atom from the nitrogen atom, with sulfuric acid, neutralizing the reaction mixture and separating therefrom the thus formed pyrrolidine.

GEORGE H. COLEMAN.